US008027395B2

(12) United States Patent
Akella et al.

(10) Patent No.: US 8,027,395 B2
(45) Date of Patent: Sep. 27, 2011

(54) EDGE MMSE FILTERS

(75) Inventors: Ramakrishna Akella, San Diego, CA (US); Roger Cheng, Hong Kong (CN)

(73) Assignee: MaxLinear, Inc., Carlsbad, CA (US)

( * ) Notice: Subject to any disclaimer, the term of this patent is extended or adjusted under 35 U.S.C. 154(b) by 638 days.

(21) Appl. No.: 11/935,316

(22) Filed: Nov. 5, 2007

(65) Prior Publication Data
US 2008/0144730 A1 Jun. 19, 2008

Related U.S. Application Data

(60) Provisional application No. 60/864,349, filed on Nov. 3, 2006.

(51) Int. Cl.
*H04L 27/28* (2006.01)
(52) U.S. Cl. ............................................. 375/260
(58) Field of Classification Search .................. 375/260, 375/316, 324, 340, 341
See application file for complete search history.

(56) References Cited

U.S. PATENT DOCUMENTS

| 6,327,314 | B1 | 12/2001 | Cimini, Jr. et al. |
| 6,487,253 | B1 | 11/2002 | Jones, IV et al. |
| 6,904,078 | B1 | 6/2005 | Abeta et al. |
| 7,286,466 | B2 * | 10/2007 | Chen et al. .................. 370/210 |
| 7,466,778 | B2 | 12/2008 | Ananth et al. |
| 7,660,229 | B2 | 2/2010 | Papasakellariou et al. |
| 7,929,645 | B2 | 4/2011 | Akella et al. |
| 2003/0198201 | A1 | 10/2003 | Ylitalo et al. |
| 2005/0105647 | A1 | 5/2005 | Wilhelmsson et al. |
| 2006/0045192 | A1 | 3/2006 | Hayashi |
| 2006/0203932 | A1 | 9/2006 | Palanki et al. |
| 2008/0031370 | A1 * | 2/2008 | Guey et al. .................. 375/260 |

FOREIGN PATENT DOCUMENTS
WO WO 2004/086076 A1 10/2004

OTHER PUBLICATIONS

International Search Report of Mar. 11, 2008 for international application No. PCT/US07/083664.
Written Opinion of Mar. 11, 2008 for international application No. PCT/US07/083664.
Office Action for U.S. Appl. No. 11/870,726, dated Jun. 7, 2010.
Notice of Allowance for U.S. Appl. No. 11/870,726, dated Dec. 17, 2010.
International Search Report of the International Searching Authority for Application No. PCT/US2007/081136, mailed on Mar. 17, 2008, 1 page.
Written Opinion of the International Searching Authority for Application No. PCT/US2007/081136, mailed on Mar. 17, 2008, 4 pages.
Preliminary Report on Patentability for Application No. PCT/US2007/081136, mailed on Apr. 15, 2009, 5 pages.

* cited by examiner

*Primary Examiner* — Sam K Ahn
(74) *Attorney, Agent, or Firm* — Kilpatrick Townsend & Stockton LLP; Ardeshir Tabibi

(57) ABSTRACT

A method for performing channel estimation of an OFDM channel includes, in part, interpolating pilots for sub-channels positioned within a first range of an OFDM symbol, and estimating frequency response of sub-channels positioned within a second range of the OFDM symbol. The first range is defined by subchannels positioned substantially away from channel edges and the second range is defined by subchannels positioned substantially near channel edges. The method optionally includes transforming the pilots from frequency domain into the time-domain, time-domain windowing to obtain a channel impulse response having a multitude of discrete values, estimating the discrete values within the channel impulse response; and transforming the channel impulse response to the frequency domain.

18 Claims, 3 Drawing Sheets

EDGE MMSE FILTERS

CROSS-REFERENCES TO RELATED APPLICATIONS

The present application claims benefit under 35 USC 119(e) of U.S. provisional application No. 60/864,349, filed Nov. 3, 2006, entitled "Edge MMSE Filters", the content of which is incorporated herein by reference in its entirety.

The present invention is also related to U.S. application Ser. No. 11/870,726, entitled "Method And Apparatus For Channel Estimation In OFDM Receivers", filed Oct. 11, 2007, the content of which is incorporated herein by reference in its entirety.

BACKGROUND OF THE INVENTION

Signal processing systems such as communication receivers often must recover a desired signal which has been transmitted through a channel degraded by multipath. In order to compensate for the signal impairment introduced thereby, receivers can use signal processing techniques which estimate the channel conditions. However, this poses challenges for channels which are changing quickly, as is the case, for example, when the receiver is mobile and moving at high speed, i.e., due to high Doppler conditions.

Orthogonal frequency division multiplexing (OFDMA) systems, such as DVB-T often provide pilot tones for the purpose of making channel estimation easier. However, the sparseness of these tones renders it difficult to estimate the channel quickly and with efficient memory usage and calculations.

FIG. 1 is a high-level block diagram of an OFDM system which employs channel estimation, as known in the prior art. Data modulated by modulator 120 and pilot tones 122 are inserted in inverse Fourier transform block 102. Block 104 adds cyclic prefix to the output of inverse Fourier transform block 102 and supplies its output to Rayleigh channel 106. The pilot tones are interspersed periodically in the subchannels to enable channel estimation block for the Rayleigh channel 106. Signal $s_m$ received by Rayleigh channel 106 for transmission may be defined as shown below:

$$s_m(t) = \sum_{k=0}^{N-1} a_{k,m} e^{j2\pi k \Delta f t}, mT_S \le t < (m+1)T_S \quad (1)$$

After the Rayleigh channel, the received signal is defined as below:

$$r_m = s_m(t) \otimes h(t) \quad (2)$$

where the channel response h(t) is defined as:

$$h(t, \tau) = \sum_k \gamma_k(t) \delta(\tau - \tau_k) \quad (3)$$

In the frequency domain, the received signal can be expressed as $$x_{l,m} = H_{l,m} a_{l,m} + w_{l,m} \quad (4)$$

where $$H_{l,m} = \Sigma \gamma_k e^{-j2\pi f \tau_k} \quad (5)$$

is the frequency response and $w_{l,m}$ represents the Additive White Gaussian Noise (AWGN). For the pilot subcarriers, the temporal channel can be obtained in accordance with the following expression:

$$\hat{H}_{l,m} = x_{l,m} a^*_{l,m} = H_{l,m} + w_{l,m} a^*_{l,m} \quad (6)$$

Block 108 removes the cyclic prefix from the received signal. Fast Fourier transform block 110 converts the time domain signal supplied by block 108 to a frequency domain signal. Block 112 extracts the pilot symbols from the signal supplied by block 110 to estimate the channel. In the above representation, the channel is assumed to be an ideal channel plus noise. To estimate the channel, the noise is suppressed and pilot interpolation is performed.

FIG. 2 shows how pilot channels are distributed among subchannels in the DVB-T/H system. DVB-T supports 2K and 8K OFDM subchannels, whereas DVB-H also supports a mode with 4K subchannels. With each successive symbol, the location of most of the pilot tones (alternatively referred to herein as pilots) changes, with the exception of the pilot tones at locations called continuous pilot locations. In this system, the pilots are inserted every 12 subcarriers in the frequency domain; this density of pilot tones is insufficient for noise suppression. One method for increasing the density of channel estimates is to use pilot tones located nearby in time and frequency to interpolate the values in between. This can be done using previous and future OFDM symbols to fill the pilots from $1/12$ total subcarrier density to $1/3$ total subcarrier density. However, conventional interpolation techniques are inefficient and require excessive amount of memory space to store data required to perform such interpolations. Conventional channel estimation techniques are not well suited for estimating the channel for sub-channels positioned near the edges of the channel.

BRIEF SUMMARY OF THE INVENTION

A channel estimator of an OFDM receiver, in accordance with one embodiment of the present invention includes, in part, an interpolator and an edge filter. The interpolator is adapted to interpolate pilots for sub-channels positioned within a first range of an OFDM symbol associated with the OFDM receiver. The edge filter is adapted to estimate frequency response of the sub-channels positioned within a second range of the OFDM symbol. The first range is defined by subchannels positioned substantially away from channel edges. The second range is defined by subchannels positioned substantially near channel edges.

In one Embodiment, the channel estimator further includes, an IFFT block adapted to transform pilots from frequency domain into the time-domain, a time-domain windowing filter for obtaining the channel impulse response, a threshold estimator having a multitude of threshold levels for estimating the discrete values within the channel impulse response, and an FFT block for transforming the channel impulse response to the frequency domain.

In one embodiment, the time-domain windowing filter has a rectangular shape with a time base corresponding to an estimated delay spread. In one embodiment, the threshold estimator estimates the discrete values within the channel impulse response in accordance with predefined threshold levels. In one embodiment, the filter is an MMSE filter adapted to estimate the frequency response of sub-channels positioned within the second range in accordance with an auto-covariance matrix of pilots positioned within the second range and a cross-covariance pilot vector. In one embodiment, the MMSE filter coefficients are defined by a product of the auto-covariance matrix of the pilots positioned within the second range and the cross-covariance of the pilots. In one embodiment, the MMSE filter coefficients are further defined by the pilots.

In accordance with another embodiment of the present invention, a method for performing channel estimation of an OFDM channel includes, in part, interpolating pilots for sub-channels positioned within a first range of an OFDM symbol, and estimating frequency response of sub-channels positioned within a second range of the OFDM symbol. The first range is defined by subchannels positioned substantially away from channel edges and the second range is defined by subchannels positioned substantially near channel edges.

In one embodiment, the method further includes transforming the pilots from frequency domain into the time-domain, time-domain windowing to obtain a channel impulse response having a multitude of discrete values, estimating the discrete values within the channel impulse response; and transforming the channel impulse response to the frequency domain.

In one embodiment, the time-domain windowing filter has a rectangular shape with a time base corresponding to an estimated delay spread. In one embodiment, the threshold estimator estimates the discrete values within the channel impulse response in accordance with predefined threshold levels. In one embodiment, the filter is an MMSE filter adapted to estimate the frequency response of sub-channels positioned within the second range in accordance with an auto-covariance matrix of pilots positioned within the second range and a cross-covariance pilot vector. In one embodiment, the MMSE filter coefficients are defined by a product of the auto-covariance matrix of the pilots positioned within the second range and the cross-covariance of the pilots. In one embodiment, the MMSE filter coefficients are further defined by the pilots.

DETAILED DESCRIPTION OF THE INVENTION

In accordance with the present invention, a channel estimation algorithm is performed in a number of steps including pilot interpolation, Sinc interpolation for channel estimation of subcarriers not located near the edges of the channel, and minimum mean-squared error (MMSE) filtering for channel estimation of subcarriers located near the edges of the channel. Pilot interpolation in the time-frequency is used to increase the pilot density to 1 pilot for every N bins. A number of pilot interpolation techniques is described in U.S. application Ser. No. 11/870,726.

Once the pilot density is increased and made uniform through the interpolation process, channel estimates for all bins can be performed through further interpolation approaches or filtering approaches. A combination of interpolation and filtering approach is used in a hybrid fashion since each type is optimal in a given domain. By using a hybrid approach involving "Sinc" interpolation for the bins (alternatively referred to herein as subcarriers or subchannels) positioned away from the edges of the channel and MMSE filtering for bins positioned near the edges, the present invention provides a solution that is uniquely suited for channel estimation in a multipath environment where the receiver is moving at high speed, i.e., high Doppler effect.

Sinc interpolation averages the time-domain impulse response to further enhance the channel estimation process. After pilot interpolation, channel estimates are available in a uniform fashion for one every N bins, where N is equal to 3 in one of the embodiment of the present invention. To obtain channel impulse response (CIR) estimation for every bin, a Sinc interpolation technique averages the pilots by processing their impulse response in the time domain. This is achieved by taking the 1/N density pilots, performing IFFT, widowing and thresholding to reduce noise and to improve SNR and then performing an FFT to come back into the frequency domain, as described further below.

Sinc interpolation can be achieved by taking the interpolated pilot, one every N bins, and performing IFFT with zeros stuffed in locations where no channel estimate is available. The output is called the time domain response and each bin is now referred to as a tap. This results in a time domain representation of the channel. The zero stuffing causes the actual time-domain impulse response and the N−1 replicas to show up. The noise, however, is spread across all the taps. By windowing (equivalently setting to zero) out the N−1 replicas, the channel response is obtained. The additional advantage is that the noise, which spreads to all time domain taps, is also rejected when the taps outside the main window are set to zero.

Figure 1:
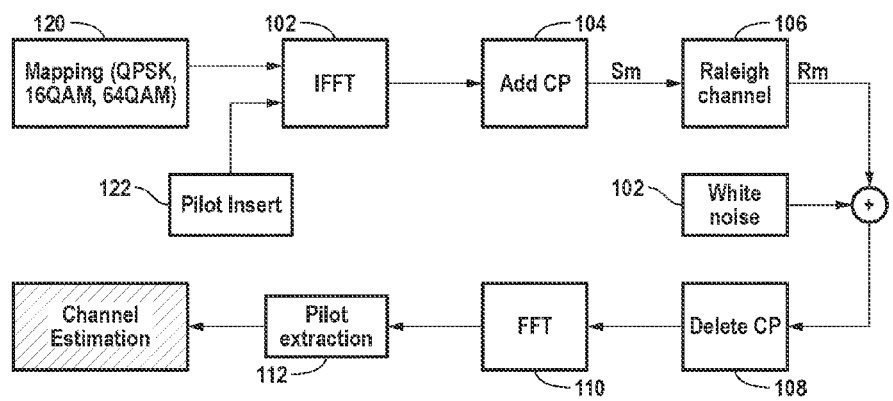
FIG. 1 is a high-level block diagram of an OFDM system which uses channel estimation, as known in the prior art.
Figure 2:
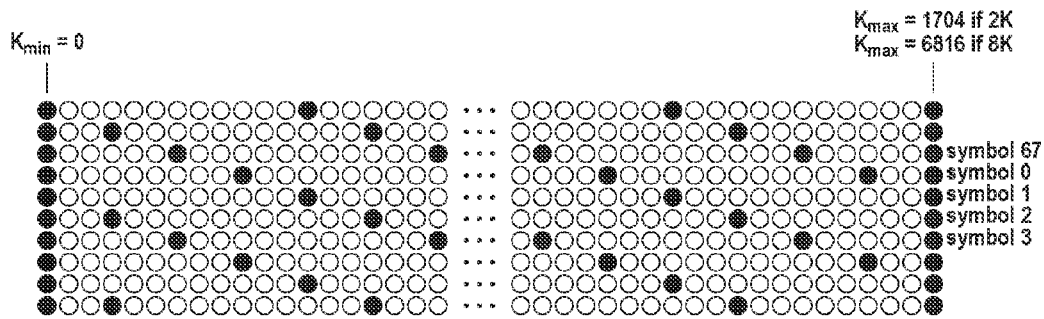
FIG. 2 shows the distribution of pilot channels among subchannels in accordance with the DVB-T/H system, known in the prior art.
Figure 3:
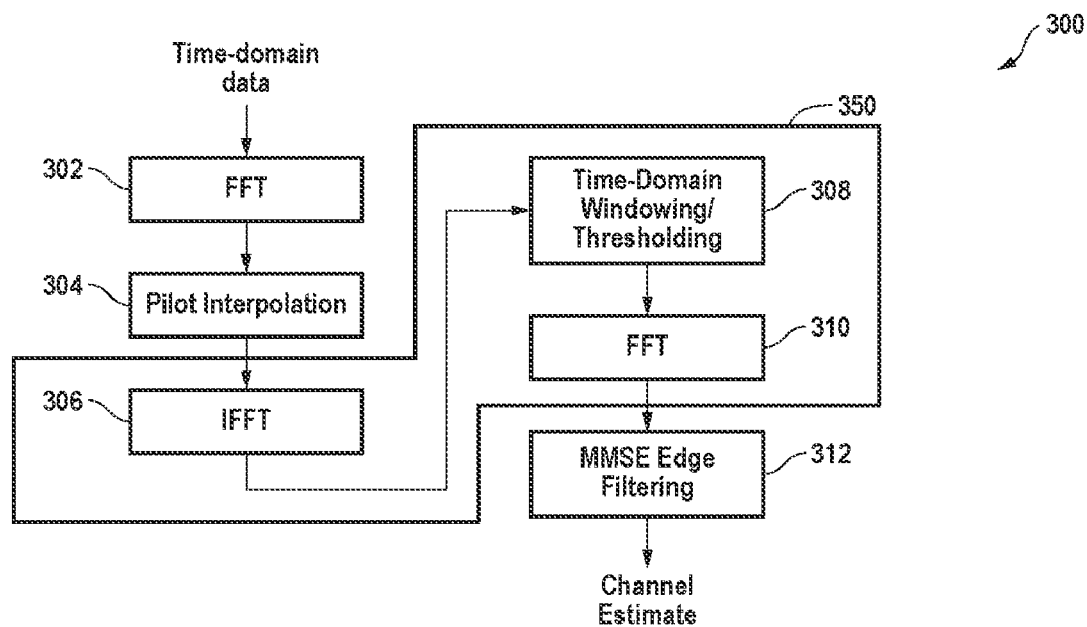
FIG. 3 is a high-level block diagram of a system adapted to estimate a channel, in accordance with one embodiment of the present invention.

Further noise can be rejected by setting some of the taps within the window of interest to zero if their magnitude is significantly smaller than the magnitude of the main taps. This is because for the SNR ranges of interest, the taps with signal energy exceed the taps with noise energy significantly. FIG. 3 is a high-level block diagram of an exemplary system 300 operative to perform channel estimation in accordance with one embodiment of the present invention. System 300 is shown as including a Fast-Fourier Transform (FFT) block 302, a pilot interpolation block 304, an inverse FFT (IFFT) block 306, a time-domain windowing/thresholding block 308, an FFT block 310 and an MMSE edge filtering block 312, described further below. FFT block 306 together with time-domain windowing/thresholding block 308, and IFFT block 310 form a sinc interpolator 350 adapted to perform sinc interpolation.

Depending on the value of the signal-to-noise ratio SNR, different levels of thresholds are optimal. At high SNR and low Doppler, for example, no threshold may be required. Since the system is capable of estimating both the SNR and the Doppler level, it can adaptively adjust the threshold to optimize overall performance. The optimal threshold also depends on the OFDM mode. For example, if $\sigma$ represents the standard deviation of the tap magnitude, then a threshold-setting scheme may be as following:

$SNR < SNR1 \Rightarrow T = 3*\sigma$ $SNR1 < SNR < SNR2 \Rightarrow T = 2*\sigma$

SNR2<SNR<SNR3=>T=σ

SNR3<SNR=>T=0

Figure 4:
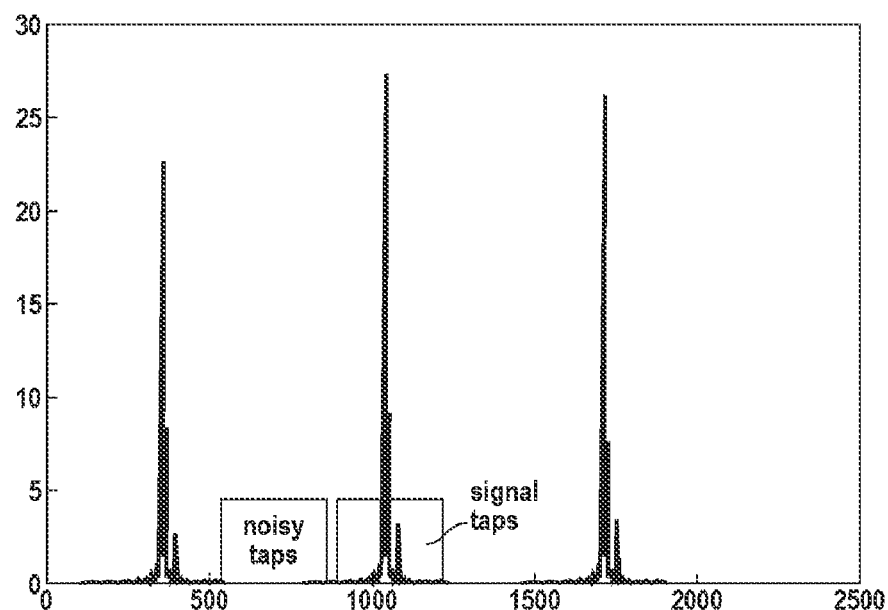
FIG. 4 shows the result of windowing operation in accordance with one embodiment.

The resulting impulse response can be smoothed through a simple IIR filter or FIR filter whose optimal parameters are adaptive with respect to SNR. The impulse response is zero-padded and transformed to the frequency domain via FFT to obtain a channel estimate for each subcarrier. FIG. 4 shows a windowing operation about the zero-delay response.

One challenge in using FFT based (ideal sinc Sin(X)/X interpolation based) channel estimation is the so-called edge effect. It arises because pilot tones are present only on one side at either end of the OFDM symbol and fewer pilots are available for sinc interpolation. The result is that the mean-squared-error (MSE) of the channel estimate at the edge subcarriers is much worse than at the subcarriers positioned away from the edges and toward the center of the channel, as shown in FIG. 5.

Figure 5:
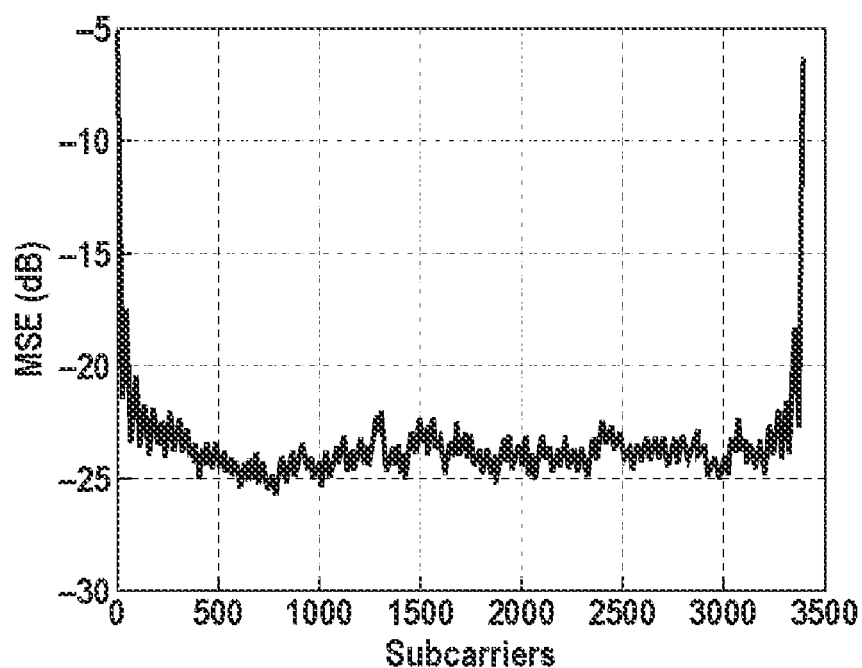
FIG. 5 shows the mean squared error (MSE) associated with subchannels disposed in the channel.

To arrive at FIG. 5, one third of the total subcarriers are used as the pilots to perform sinc interpolation. SNR is 18 dB. Approximately, 20-50 subcarriers positioned near the two edges are seen to have significantly higher MSE. To reduce the edge effect associated with edge, the time domain window length may be increased. However, the increase in the time domain window will increase the MSE of the center subcarriers because more noise is introduced. In accordance with one embodiment of the present invention, MMSE filtering/interpolation is applied at the edges to reduce this edge effect.

Filtering techniques for channel estimation tend to use the underlying signal statistics while interpolation techniques use a polynomial interpolation independent of the underlying signal statistics. In systems where pilots are available for some bins and not for others, the filtering techniques attempt to form a filter, typically linear, that use the pilots around the bin of interest to generate an estimate of the frequency response that is nearly optimal in some measures. In most cases, the optimality criterion is to minimize the mean squared error between the real and the estimated quantity.

As described above, the interpolation approaches work well when used for bins away from the edges, e.g., near the center of an OFDM symbol, because the interpolators are able to use available pilot tones on either side of the bin of interest to arrive at the estimate (channel estimate) in the bin of interest. However, interpolation fails at the edges of a symbol since pilot tones are available on one side. In accordance with the present invention, the channel is estimated for the edge bins through individually tailored MMSE filters (on a per bin basis). In other words, in accordance with the present invention, interpolation is performed for bins positioned away from the edges, alternatively referred to herein as middle bins, whereas individually tailored MMSE filters are performed for the edge bins. The gain in the MMSE filters and the interpolation is maintained balanced. In the following it is understood that that the actual channel is not known and is unavailable and it is used as a mathematical construct to describe the algorithm of the present invention and referred to herein as MMSE filter algorithm.

Assume that pilot tones are available with $1/3^{rd}$ density in an OFDM symbol. This means pilot tones are available at bins $\{0, 3, 6, 9, \ldots M\}$. In the case of DVB-T/H, M is 1704 for the 2K mode, 3408 for the 4K mode and 6816 for the 8K mode. This is a valid assumption since the final interpolation is made after one round of time-frequency interpolation is performed and the pilot density is increased from $1/12^{th}$ to $1/3^{rd}$ through a frequency domain linear filtering scheme.

Therefore, the channel for bins $\{1, 2, 4, 5, 7, 8, \ldots, M-2, M-1\}$ is estimated. Moreover, although the pilot tones can be used as channel estimates for bins $\{0, 3, 6, \ldots, M\}$, the channel estimates can also be improved at bins where pilot tones exist. Hence, the general problem is stated as: given pilot tones at bins $\{0, 3, 6, \ldots, M-1\}$, find the channel estimate at all bins, $\{0, 1, 2, 3, \ldots, M-2, M-1\}$. For the tones (also referred to as bins, subchannels, subcarriers) positioned substantially away from the edges, e.g., subchannels positioned outside of the range defined by, e.g., 1%-5% of the total number of subchannels, this is achieved through sinc interpolator based interpolation. For the bins positioned substantially near the edges, e.g., those falling within the range defined by 1%-5% of the total number of subchannels, individually tailored MMSE filters are developed. For example, in a channel with 8192 subchannels, an MMSE filter is used for estimation of the sub-channels which are 80-400 tones away from the channel edges. The estimation of the remaining subchannels is performed using a sinc interpolator. The filters are derived as follows.

Define the estimate as $$\hat{p}_i = [W_{L,i} W_{L-1,i}, \ldots, W_{0,i}] \begin{bmatrix} p_0 \\ p_3 \\ \ldots \\ p_L \end{bmatrix} = W_i P_0^L \quad (7)$$

where L is a multiple of M. In one embodiment of the present invention, L is 30, i.e., the vector of pilots $P_0^L$ contains ten pilots.

Then the error is defined as:

$$e_i = p_i - \hat{p}_i \quad (8)$$

The objective then is to find a filter $W_i$ (for bin i and of length L and using the available tones around bin i such that the mean of the error squared is minimized.) For simplicity, the available bins starting at index 0 and ending at L are used since only edges are of interest, however other bins may also be used. Equivalently, we need to find $W_i$ such that $E(\|e_i\|^2)$ is minimized.

Expanding further, $$E(\|e_i\|^2) = E\{(p_i - W_i P_0^L)(p_i - W_i P_0^L)^H\} \quad (9)$$

$$= E(\|p_i\|^2) - W_i E(P_0^L p_i^H) - E(p_i (P_0^L)^H) W_i^H +$$

$$W_i E(P_0^L (P_0^L)^H) W_i^H$$

Hermitian operation is used since all quantities are complex valued. Since there is a need to know the mean values of quantities, underlying statistics are required. This is done by assuming the worst case channel. In other words, the channel is assumed to have equal energy taps spread across the worst case delay spread.

Deriving the optimal filter coefficients involves differentiating the equation given above relative to $W_i$ and setting it to 0, as is well known. The final optimal filter coefficients are as shown below.

$$W_{i,OPT}^{II} = R_{pp}^{-1}R_{hp,i} = \left[E\left[\begin{bmatrix}p_0\\p_1\\\ldots\\p_L\end{bmatrix}[p_0^* \ p_1^* \ \ldots \ p_L^*]\right]\right]^{-1}\begin{pmatrix}E(p_0p_i^*)\\E(p_1p_i^*)\\\ldots\\E(p_Lp_i^*)\end{pmatrix} \quad (10)$$

As can be seen, the second cross-correlation (also called cross-covariance thereinafter) term is dependent on the index i. Therefore, a new filter is needed for each bin. The linear MMSE estimator for such a system is, therefore as follows:

$$\hat{p} = R_{pp}^{-1}R_{hp,i}P_0^L. \quad (11)$$

where $R_{pp}^{-1}$ is the auto-covariance matrix of the pilots, and $P_0^L$ is the vector of pilots.

To design the MMSE linear filter, both $R_{hp,i}$ (the cross covariance matrix) and the auto-covariance matrix $R_{pp}$ of the pilot need to be known. The covariance matrices can be calculated from the channel delay profile and SNR. In practice, with current technology it is too expensive to estimate these parameters continuously. Therefore, one simplification is to assume that the delay profile has a rectangular shape. In other words, the channel taps are assumed to be equally distributed over a window with the same energy. Then, the channel correlation is a sinc function. To determine the width of the rectangle, a worst case delay is used and a moderate SNR level (relative to sensitivity) is assumed. These assumptions result in a fixed linear filter which is applied to the subcarriers at the edges.

The rectangle channel profile can be expressed as $$\sigma_{rec}(\tau) = \begin{cases}\frac{1}{2\tau_{max}}, & |\tau| < \tau_{max}\\ 0, & \text{otherwise}\end{cases}$$

where $\tau_{max}$ is the maximum delay spread.

The frequency domain correlation function for bins that are separated by $\Delta f$ in frequency is $$r_{rec}(\Delta f) = \frac{\sin(2\pi\Delta f\tau_{max})}{2\pi\Delta f\tau_{max}},$$

From the discussion above it is seen that:

$$E(p_lp_m^*) = r_{rec}[(l-m)\Delta f] = \frac{\sin[2\pi|(l-m)|\Delta f\tau_{max}]}{[2\pi|(l-m)|\Delta f\tau_{max}]}, l \neq m$$

$$E(|p_l|^2) = 1 + \sigma_W^2.$$

All the information needed to calculate and $R_{pp}$ and $R_{hp,i}$ is available. In the case of the diagonal term, the extra term is due to the white noise in the system. Hence all the terms of $R_{pp}$ and $R_{hp,i}$ can be calculated for each bin location "i", and the edge filters can be individualized for each location.

Figure 6:
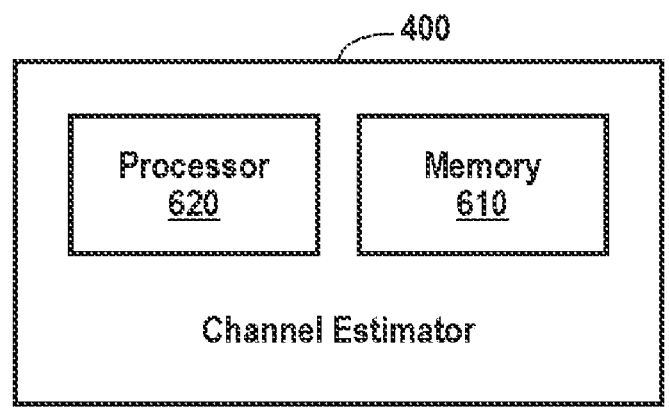
FIG. 6 shows various blocks of a channel estimation system, in accordance with one embodiment of the present invention.

FIG. 6 is a block diagram of a channel estimator 400 disposed in a receiver and adapted to interpolate the channel in accordance with one embodiment of the present invention. Channel estimator 400 is shown as including, in part, a memory 610 and a processor 620. Memory 610 is adapted to store data. Processor 620 retrieves the data stored in memory 610 to perform interpolation and filtering operations to estimate the channel in accordance with any of the expressions described above. Processor 600 may be a general central processing unit (CPU) commercially available or may be a dedicated logic block adapted to perform the interpolations described above.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A channel estimator disposed in an Orthogonal Frequency Division Multiplexing (OFDM) receiver, the channel estimator comprising:
    an interpolator adapted to interpolate pilots for sub-channels positioned within a first range of an OFDM symbol; and
    a filter adapted to estimate frequency response of sub-channels positioned within a second range of the OFDM symbol, said first range defined by subchannels positioned substantially away from channel edges and said second range defined by subchannels falling substantially near channel edges.

2. The channel estimator of claim 1 wherein the interpolator comprises:
    an IFFT block for transforming pilots from frequency domain into the time-domain;
    a time-domain windowing filter for obtaining a channel impulse response having a plurality of discrete values;
    a threshold estimator having a plurality of threshold levels for estimating the discrete values within the channel impulse response; and
    an FFT block for transforming the channel impulse response to the frequency domain.

3. The channel estimator of claim 2 wherein the time-domain windowing filter has a rectangular shape with a time base corresponding to an estimated delay spread.

4. The channel estimator of claim 2 wherein the threshold estimator estimates the discrete values within the channel impulse response in accordance with predefined threshold levels.

5. The channel estimator of claim 1 wherein the filter is an MMSE filter adapted to estimate the frequency response of sub-channels positioned within the second range in accordance with an auto-covariance matrix of pilots positioned within the second range and a cross-covariance pilot vector.

6. The channel estimator of claim 5 wherein the MMSE filter coefficients are defined by a product of the auto-covariance matrix of the pilots positioned within the second range and the cross-covariance of the pilots.

7. The channel estimator of claim 1 wherein the frequency response of each sub-channel positioned within the second range of the OFDM symbol is estimated in accordance with a product of the MMSE filter coefficients and the pilots.

8. The channel estimator of claim 2 wherein the threshold estimator removes the estimated discrete values within the channel impulse response when the estimated discrete values are below an optimum threshold level.

9. The channel estimator of claim 8 wherein the optimum threshold level is adaptively adjusted based on a standard deviation of the discrete values.

10. A method for performing channel estimation of an Orthogonal Frequency Division Multiplexing (OFDM) channel, the method comprising:
    interpolating pilots for sub-channels positioned within a first range of an OFDM symbol; and
    estimating frequency response of sub-channels positioned within a second range of the OFDM symbol using a filter, said first range defined by subchannels positioned substantially away from channel edges and said second range defined by subchannels positioned substantially near channel edges.

11. The method of claim 10 further comprising:
transforming pilots from frequency domain into the time-domain;
time-domain windowing to obtain a channel impulse response having a plurality of discrete values;
estimating the discrete values within the channel impulse response; and
transforming the channel impulse response to the frequency domain.

12. The method of claim 11 wherein the time-domain windowing has a rectangular shape with a time base corresponding to an estimated delay spread.

13. The method of claim 11 further comprising estimating the discrete values within the channel impulse response in accordance with predefined threshold levels.

14. The method of claim 11 wherein the frequency response of sub-channels positioned within the second range is estimated in accordance with an auto-covariance matrix of pilots positioned within the second range and a cross-covariance pilot vector.

15. The method of claim 14 wherein the frequency response of sub-channels positioned within the second range is estimated in accordance with a product of the auto-covariance matrix of the pilots positioned within the second range and the cross-covariance pilot vector.

16. The method of claim 15 wherein the frequency response of sub-channels positioned within the second range is estimated in accordance with a product of filter coefficients and the pilots.

17. The method of claim 11 further comprising removing the discrete values within the channel impulse response when the estimated discrete values are below an optimum threshold level.

18. The method of claim 17 wherein the optimum threshold level is adaptively adjusted based on a standard deviation of the discrete values.

* * * * *